(12) United States Patent  (10) Patent No.: US 7,331,724 B2
Hasegawa et al.  (45) Date of Patent: Feb. 19, 2008

(54) CAMERA-EQUIPPED PORTABLE DEVICE

(75) Inventors: Akira Hasegawa, Tokyo (JP); Susumu Otsuki, Kanagawa (JP); Teruo Nanmoku, Kanagawa (JP); Katsumasa Yamaguchi, Kanagawa (JP); Toshiyuki Tsumura, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 367 days.

(21) Appl. No.: 10/541,018

(22) PCT Filed: Jan. 19, 2004

(86) PCT No.: PCT/JP2004/000368

§ 371 (c)(1),
(2), (4) Date: Jun. 28, 2005

(87) PCT Pub. No.: WO2004/066616

PCT Pub. Date: Aug. 5, 2004

(65) Prior Publication Data

US 2006/0104628 A1    May 18, 2006

(30) Foreign Application Priority Data

Jan. 21, 2003  (JP) ............................. 2003-012259
Jan. 21, 2003  (JP) ............................. 2003-012260

(51) Int. Cl.
H04N 5/222  (2006.01)
G03B 17/04  (2006.01)
G06F 3/02   (2006.01)
G09G 5/00   (2006.01)

(52) U.S. Cl. .................. 396/348; 348/333.06; 345/169
(58) Field of Classification Search ................. 396/287, 396/348; 345/168, 169; 348/333.06, 333.08, 348/335
See application file for complete search history.

(56) References Cited

U.S. PATENT DOCUMENTS

2004/0169642 A1* 9/2004 Olodort et al. ............. 345/168

FOREIGN PATENT DOCUMENTS

| JP | 8-321863    | 12/1996 |
| JP | 2001-169166 | 6/2001  |
| JP | 2002-158758 | 5/2002  |
| JP | 2003-069676 | 3/2003  |
| JP | 2003-239942 | 8/2003  |
| JP | 2003-298698 | 10/2003 |

* cited by examiner

Primary Examiner—Melissa Jan Koval
(74) Attorney, Agent, or Firm—Wenderoth, Lind & Ponack, L.L.P.

(57) ABSTRACT

A portable device includes a camera section, a camera image display, a first case having a first surface having the display therein and a second surface opposite the first surface, a second case that can be positioned over the second surface of the first case, a rotation axis section supporting the second case to the first case rotatably about an axis perpendicular to the first surface of the first case, and a camera/display operation section. The camera section has an optical axis, and the rotation axis section accommodates the camera section so that the optical axis is parallel to the rotation axis. The operation section is on the first surface of the first case opposite an image-capturing direction of the rotation axis of the rotation axis section.

26 Claims, 20 Drawing Sheets

Fig. 19 – PRIOR ART
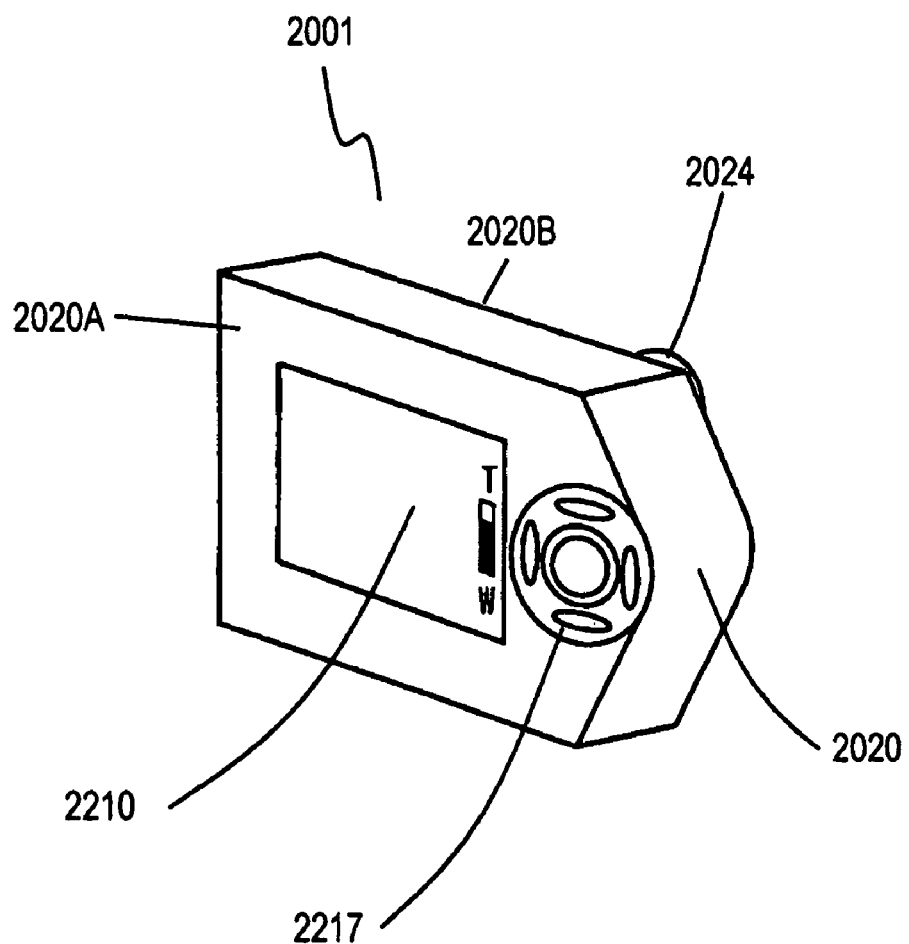

US 7,331,724 B2

CAMERA-EQUIPPED PORTABLE DEVICE

TECHNICAL FIELD

The present invention relates to a portable device equipped with a camera, such as a camera-equipped portable telephone.

BACKGROUND OF THE INVENTION

Camera-equipped portable devices, such as CCD-camera-equipped or CMOS-camera-equipped notebook computers or portable telephones have been commercially available.

Cameras included in the camera-equipped portable devices have resolutions of just about several hundreds of thousands pixels while digital cameras have high resolutions of several-million pixels. In a digital camera shown in FIG. 19, display 2210 and operation section 2217 is provided on surface 2020A of case 2020, and camera section 2024 is provided on surface 2020B of case 2020 opposite to display 2210. Case 2020, being thick, can accommodate a camera having a certain length in its optical axis direction. Since it is required to have a small size and a small weight, a camera-equipped portable device has a thin case, and thus, the case may not accommodate a high-resolution camera section having a certain length in its optical axis direction.

Japanese Patent Laid-Open Publication No. 2001-169166 discloses a portable terminal that accommodates a camera section having a certain length in its optical axis direction. This portable terminal includes a main body and a flip for opening and closing the main body, and accommodates a lens for image-capturing in the direction of a rotation axis of the flip. This rotation axis is parallel to a display screen, such as a liquid crystal display, that is generally provided on a flat portion of the main body or the flip, and thus, a user cannot capture an image of an object while looking at the image on the display screen. In order to capture the image of the object while looking at it on the display screen of this portable terminal, the flip can rotate in a direction perpendicular to the rotation axis, and the flip necessarily rotates perpendicularly to the optical axis direction of the camera section.

SUMMARY OF THE INVENTION

A portable device includes a camera section, a display capable of displaying an image captured by the camera section, a first case having a first surface having the display therein and a second surface opposite to the first surface, a second case that can be positioned over the second surface of the first case, a rotation axis section rotatably mounting the second case to the first case for rotation about a rotation axis perpendicular to the first surface of the first case, and an operation section that operates at least one of the camera section and the display. The camera section has an optical axis and is capable of capturing an image of an object in an image-capturing direction parallel to the optical axis. The rotation axis section accommodates the camera section so that the optical axis is parallel to the rotation axis, and the image-capturing direction is directed from the first surface of the first case to the second surface of the first case. The operation section is provided at a portion of the first surface of the first case opposite to the image-capturing direction of the rotation axis of the rotation axis section.

This portable device can accommodate the camera section even if the camera is long in the direction of the optical axis.

BRIEF DESCRIPTION OF THE DRAWINGS

FIG. 19 is a perspective view of a conventional digital camera.

DETAILED DESCRIPTION OF PREFERRED EMBODIMENTS

Exemplary Embodiment 1

Figure 1:
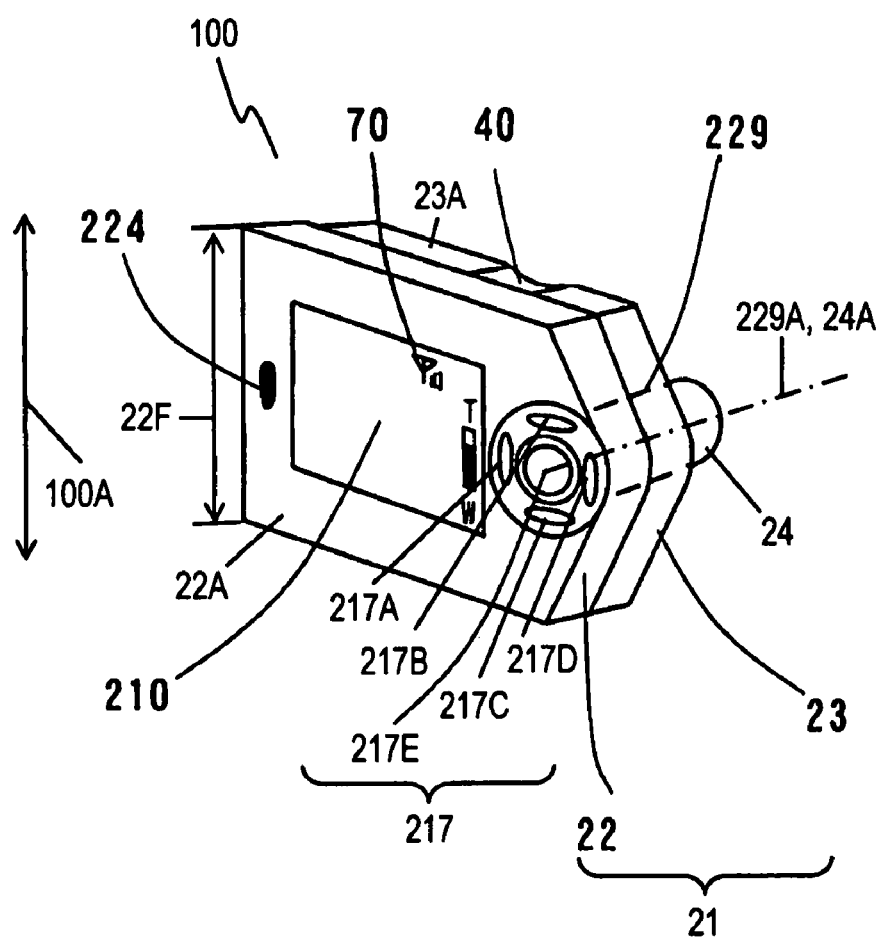
FIG. 1 is a perspective view of a camera-equipped portable device according to Exemplary Embodiment 1 of the present invention.

FIG. 1 is a perspective view of camera-equipped portable telephone 100 as a camera-equipped portable device according to Exemplary Embodiment 1 of the present invention. Portable telephone 100 includes case 21 including first case 22 and second case 23 both having substantially rectangular shapes. In FIG. 1, cases 22 and 23 are placed together over one another. Display 210, first operation section 217, and loudspeaker 224 functioning as a receiver are provided in surface 22A of first case 22. In first case 22, rotation axis 229A is provided perpendicularly to surface 22A so that rotation axis section 229 allows second case 23 to rotate about rotation axis 229A. Camera section 24 is accommodated in a surface of rotation axis section 229 opposite to display 210. Optical axis 24A of camera section 24 is parallel to rotation axis 229A, and the camera section can capture an image of object 133 in image-capturing direction 24B along optical axis 24A. First operation section 217 is provided on a surface of rotation axis section 229A opposite to camera section 24. First operation section 217 includes five switches: four buttons 217A to 217D placed at upper, lower, left, and right positions; and button 217E at a center among the four buttons. For example, buttons 217D and 217C placed at the upper and lower positions are used to perform a zoom operation for scaling the image on a screen of display 210 after camera section 24 captures the image. Buttons 217A and 217D placed at the left and right positions are used for a brightness adjustment of the screen, and button 217E placed at the center is used as a shutter button of camera section 24 for image-capturing. Similarly to conventional digital camera 2001 shown in FIG. 19, a user of portable telephone 100 displays a monitor image on display 210 while first case 22 is put together over second case 23, as shown in FIG. 1, and presses shutter button 217E of first operation section 217 for capturing the image of the object.

Width 22G of second case 23 in a direction substantially parallel to rotatable direction 100A is smaller than width 22F (refer to FIG. 5) of first case 22 in the direction. Each of side surface 23A and a side surface opposite to it has recess 40 formed therein.

Figure 2A:
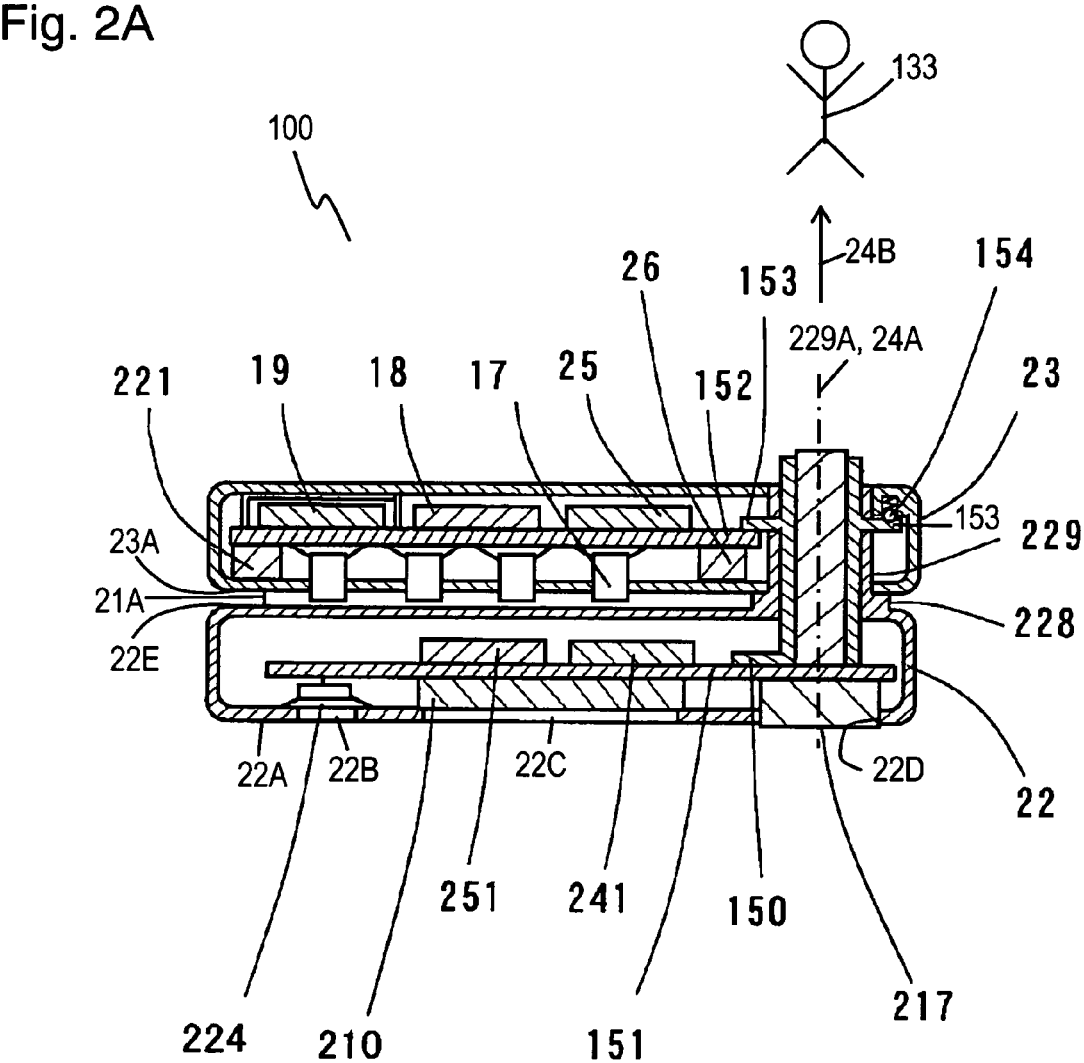
FIG. 2A is a cross sectional view of the camera-equipped portable device according to Embodiment 1.

FIG. 2A is a cross sectional view of camera-equipped portable telephone 100. First case 22 accommodates loudspeaker 224, display 210, first operation section 217, image processor 241, and first printed circuit board 151 having first memory 251 mounted thereon. Windows 22B to 22D are provided in surface 22A of first case 22 for loudspeaker 224, display 210, and first operation section 217, respectively. Through these windows, an audio is output, a monitor image is displayed, and a button is activated. Rotation axis section 229 protrudes perpendicularly to surface 22E from surface 22E of first case 22 opposite to surface 22A. Slide connection section 150 is fitted in rotation axis section 229, and camera section 24 is accommodated in slide connection section 150. Slide connection section 150 and camera section 24 are both fixed to and connected to first printed circuit board 151.

Second case 23 is engaged with rotation axis section 229 rotatably. Base 228 having a radius longer than that of rotation axis section 229 is provided at the bottom portion of rotation axis section 229. Base 228 prevents second case 23 from getting close to first case 22 in a direction along rotation axis 229A, thus providing gap 21A between the first case and the second case. Even if first case 22 rotates, gap 21A prevents case 22 not only from contacting second case 23 but also from contacting second operation section 17 provided on surface 23A of second case 23 facing the first case.

Second case 23 accommodates second printed circuit board 152. Second printed circuit board 152 has second operation section 17 formed of, e.g. a numerical-key pad for input of telephone numbers, microphone 221 functioning as a transmitter, radio section 19, controller 18, second memory 25, and rotation detector 26. Second printed circuit board 152 slides on contact section 153 of slide contact section 150 having a flange shape. This structure always connects second printed circuit board 152 with first printed circuit board 151 even when second case 23 rotates relative to first case 22.

Figure 2B:
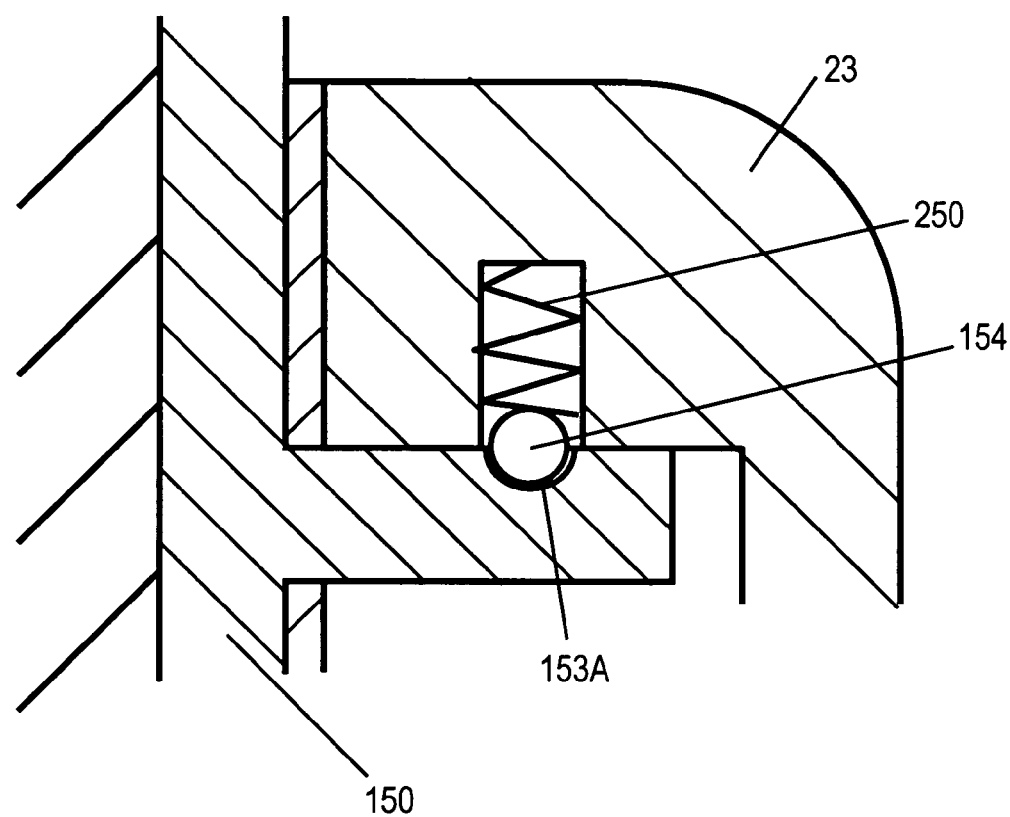
FIG. 2B is an enlarged cross sectional view of the camera-equipped portable device according to Embodiment 1.

FIG. 2B is an enlarged view of contact section 153. Pocket 153A is provided in an upper surface of contact section 153, and receives ball 154 therein so as to position ball 154. Spring 250 urges ball 154 from second case 23, and engages ball 154 in pocket 153A at a predetermined rotation angle. Thereby, first case 22 and second case 23 are positioned and fixed at the predetermined rotation angle. Contact section 153 can rotate against a force of spring 250.

Figure 3:
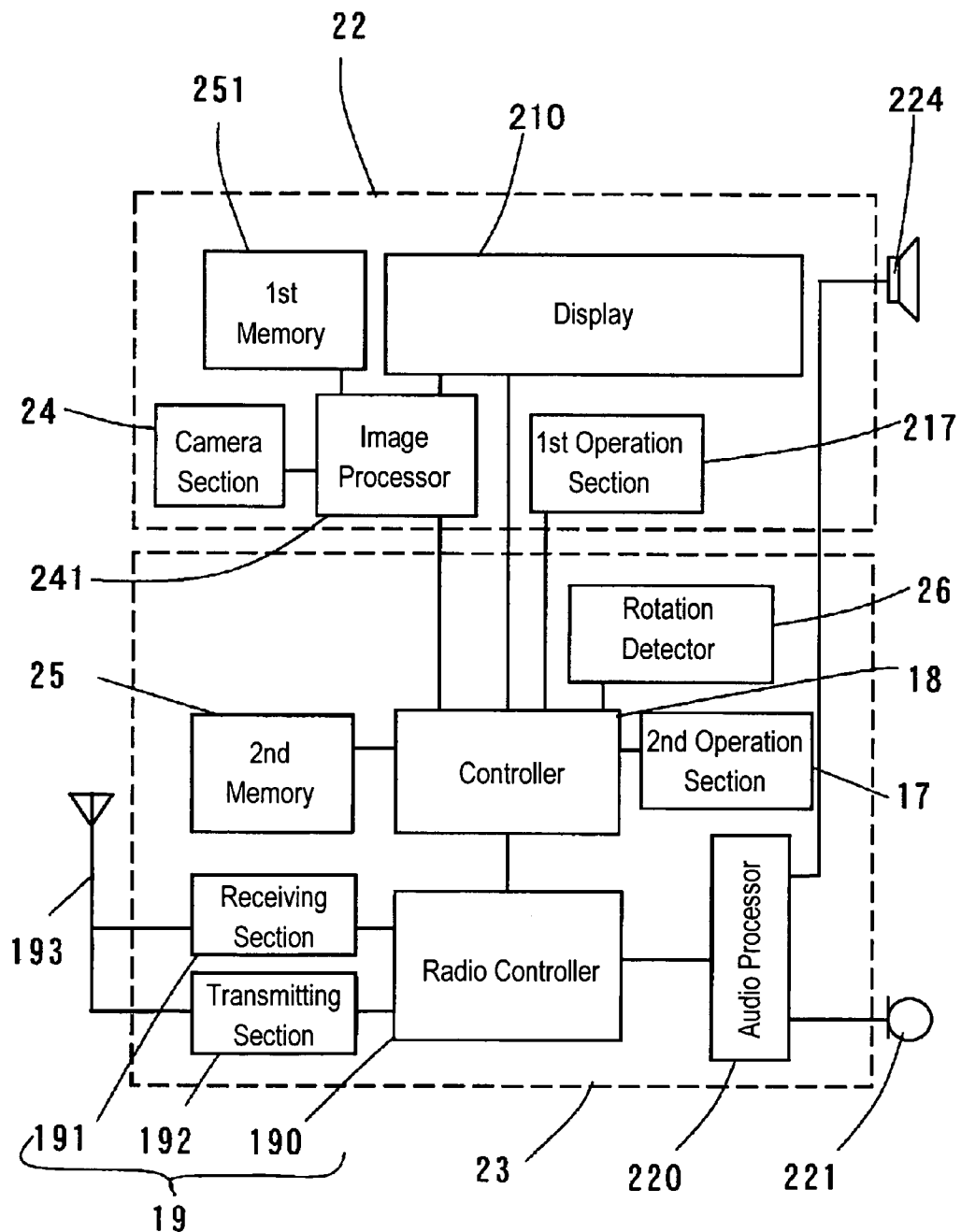
FIG. 3 is a block diagram of the camera-equipped portable device according to Embodiment 1.

FIG. 3 is a block diagram of camera-equipped portable telephone 100 of Embodiment 1. First case 22 and second case 23 are indicated by broken lines. As described above, loudspeaker 224, display 210, first operation section 217, image processor 241, first memory 251, and camera section 24 are provided in first case 22.

Image processor 241 is connected to controller 18. Controller 18 in second case 23 controls portable telephone 100. First case 22 provides a camera module with image processor 241, camera section 24, display 210, and first memory 251. Image processor 241 controls an operation of the camera section, thus having first case 22 function as a camera unit. Image processor 241 is connected with camera section 24, first memory 251, and display 210. First operation section 217 is connected to controller 18. When the user of portable telephone 100 inputs a signal through first operation section 217 for initiating a camera mode, controller 18 supplies a signal instructing image processor 214 to start the camera mode. Image processor 241 turns on camera section 24 with a battery (not shown), and then processes data of an image captured by camera section 24 for displaying the image on display 210. When the user presses shutter button 217E of first operation section 217, the image captured by camera section 24 is stored in first memory 251, and the stored image is displayed on display 210. When the user inputs a signal through first operation section 217 for quitting the camera mode, image processor 241 turns off camera section 24, and controller 18 quits the camera mode.

Controller 18, radio section 19, second operation section 17, second memory 25, rotation detector 26, and audio processor 220 are provided in second case 23. Radio section 19 includes receiving section 191, transmitting section 192, and radio controller 190. Second case 23 mainly serves as a radio unit with radio section 19 and controller 18. Radio controller 190 is connected to transmitting section 192 and receiving section 191. Radio controller 190 performs radio communications with other telephones via a base station with transmitting section 192, receiving section 191, and antenna 193 under control of controller 18. Audio processor 220 converts a received audio signal into audio to be output to loudspeaker 224, and converts an audio signal from microphone 221 into a radio signal to be transmitted.

As shown in FIG. 1, camera-equipped portable telephone 100 can be used as a digital camera while first case 22 is put together with second case 23. That is, the user holds first operation section 217 with his/her right hand, and holds the left side of display 210 with his/her left hand. While looking at the screen of display 210, the user activates upper button 217B and lower button 217C to perform a zoom operation of the screen, activates left button 217A and right button 217D to adjust the brightness of the screen, and presses shutter button 217E at the center to capture the image of the object.

Figure 4:
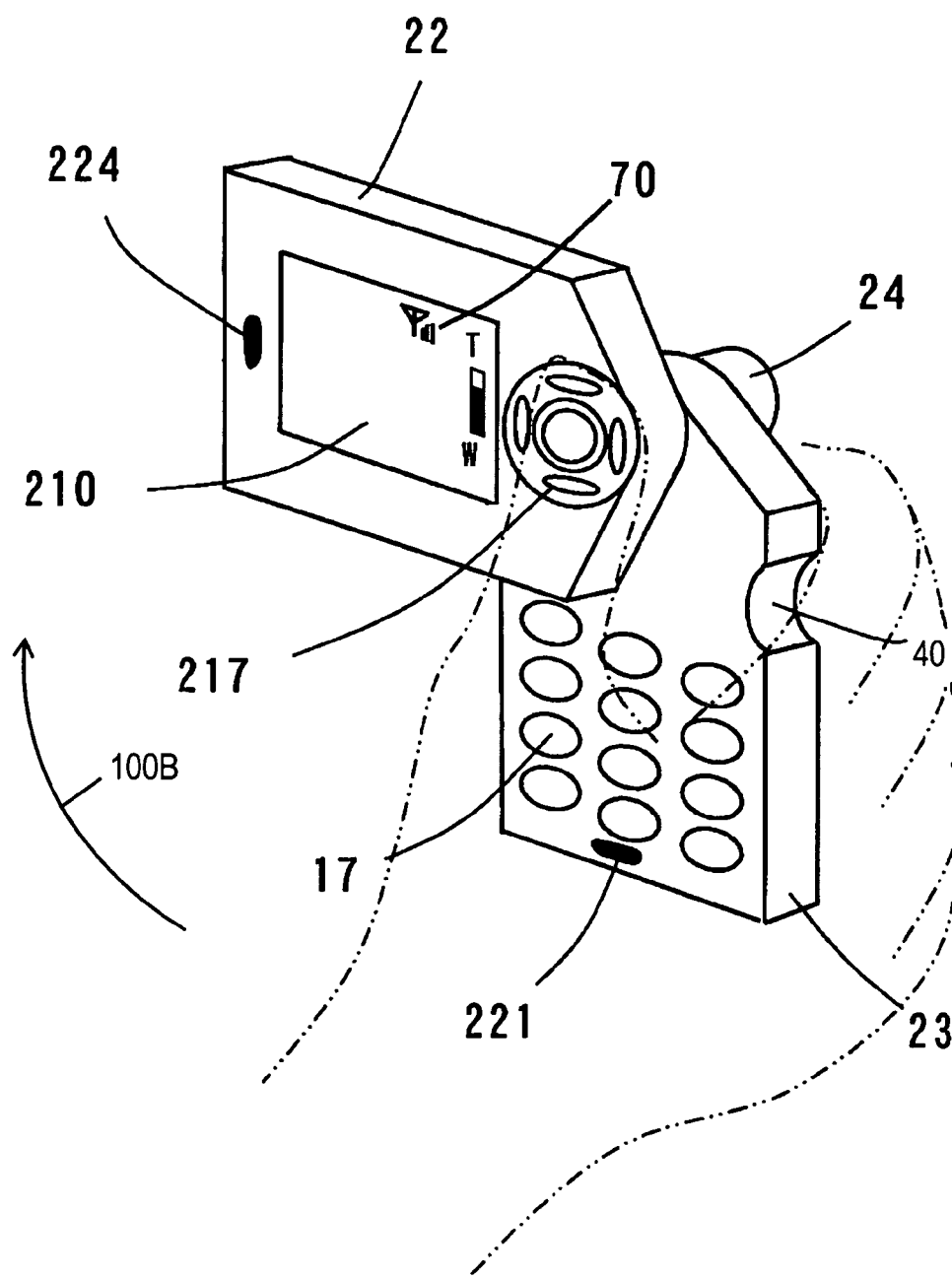
FIG. 4 is a perspective view of the camera-equipped portable device in use according to Embodiment 1.

As shown in FIG. 4, after having second case 23 rotate 90 degrees relative to first case 22 in direction 100B, the user can activate first operation section 217 with the thumb of his/her right hand while holding second case 23 with his/her right hand to allow the screen of display 210 to laterally orient for capturing the image of the object. In the state shown in FIG. 1, the user holds portable telephone 100 with his/her both hands. In the state shown in FIG. 4, the user can hold portable telephone 100 with one of his/her hands so that he/she can use it easily with one hand. Further, the user can activate second operation section 17 in second case 23 which is hidden by first case 22 in the state shown in FIG. 1, and therefore, can set detailed conditions for the image-capturing through second operation section 17. Further, the user can input text through second operation section 17 including a title of the captured image while looking at the screen of display 210.

Figure 5:
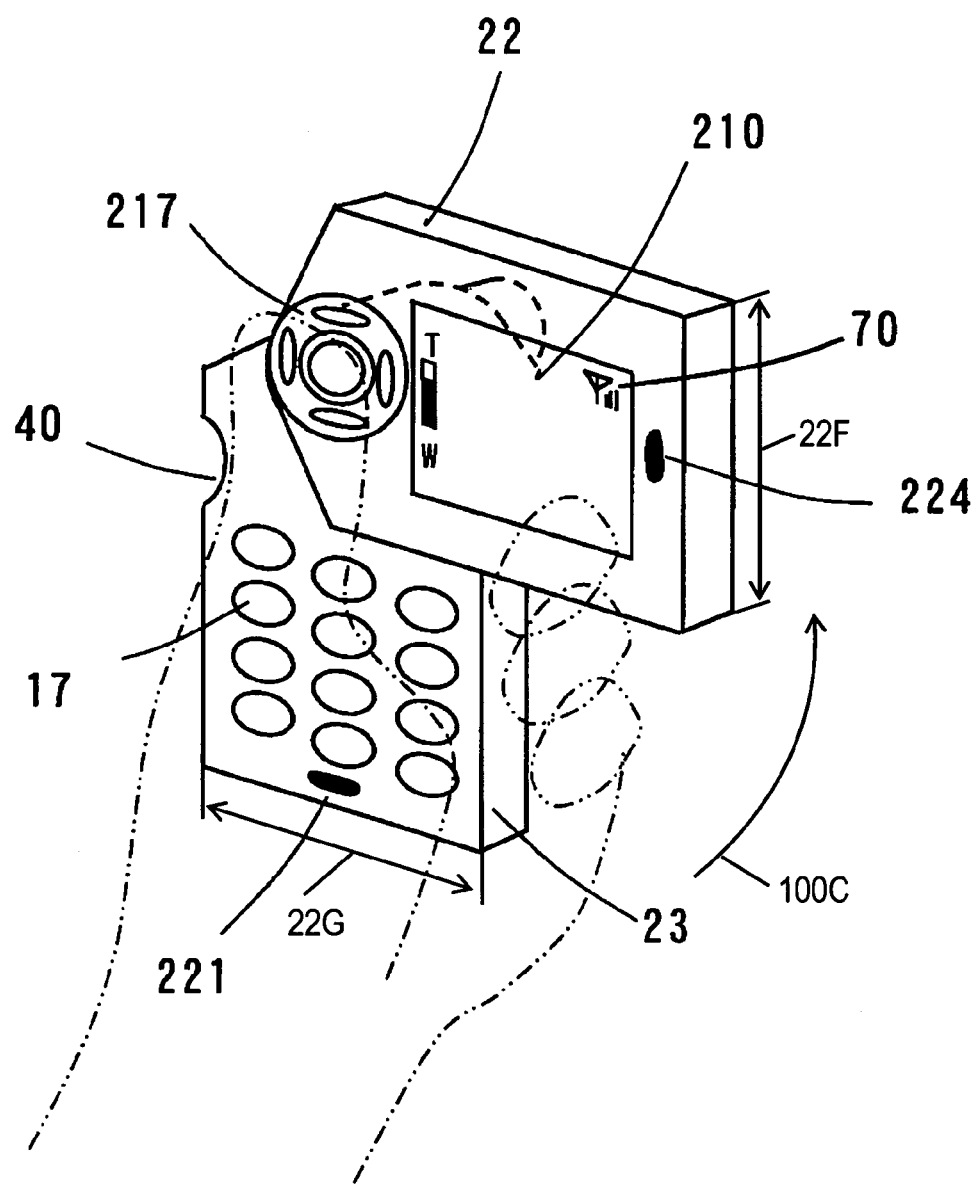
FIG. 5 is a perspective view of the camera-equipped portable device in use according to Embodiment 1.

FIG. 5 shows the state in which the user rotates first case 22 in direction 100C opposite to that of the state shown in FIG. 4, holds second case 23 with his/her left hand, and activates first operation section 217 with the thumb of his/her left hand for capturing the image of the object while the screen laterally orients. This arrangement allows the device to be activated only with the left hand. In the state shown in FIG. 5, first case 22 is oriented upside down relative to the state shown in FIG. 4. Rotation detector 26 detects the rotation angle of first case 22, that is, the relative position between first case 22 and second case 23. According to the rotation angle of the first case detected by rotation detector 26, controller 18 changes the orientation of icon 70 upside down for displaying it on display 210, and reverses the functions allocated to four buttons 217A to 217D of first operation section 217. That is, the functions of buttons 217A to 217D do not change, e.g., the button at the upper position is provided for scaling up, and a button at the lower position is provided for scaling down.

Figure 6:
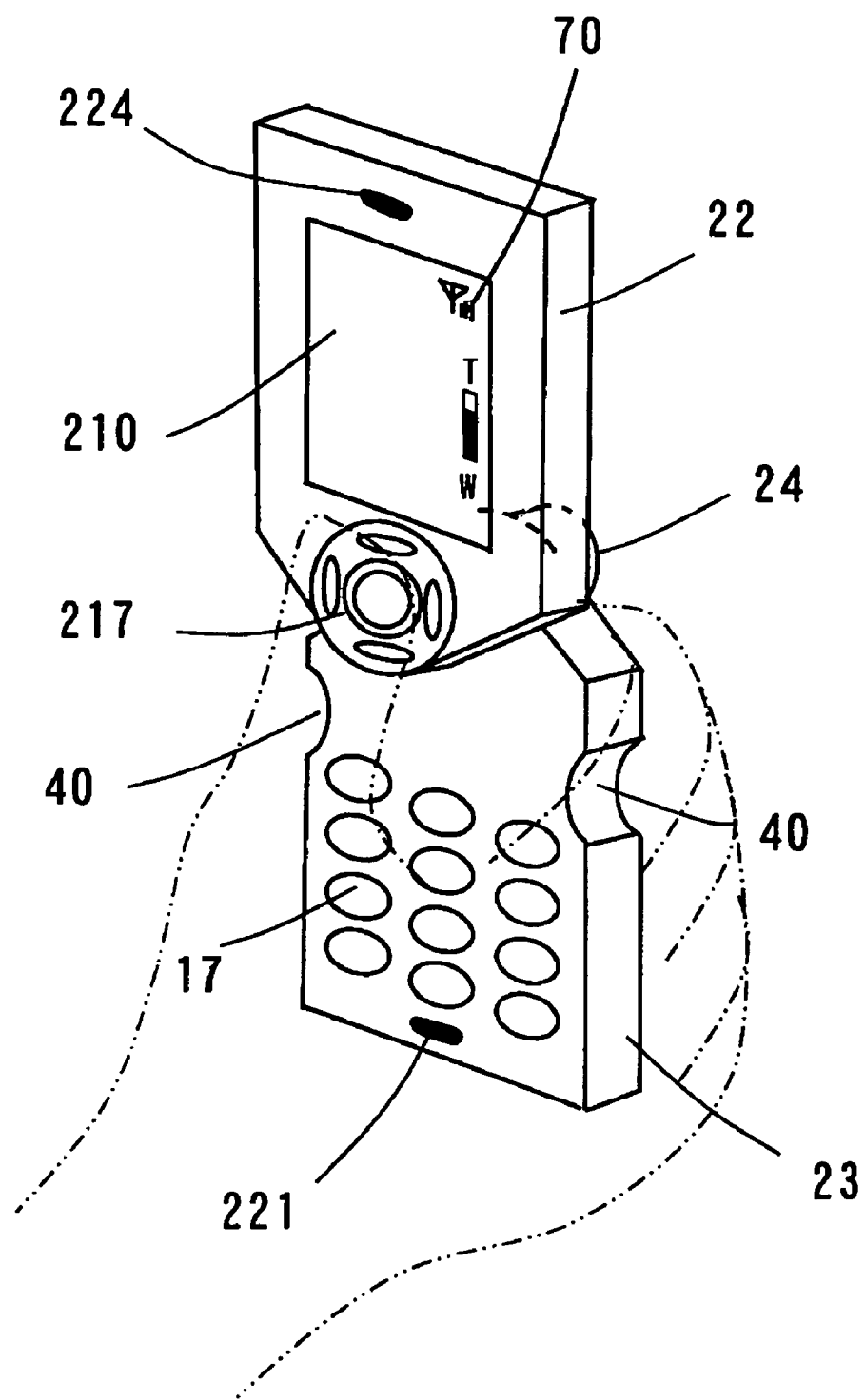
FIG. 6 is a perspective view of the camera-equipped portable device in use according to Embodiment 1.

FIG. 6 shows the state in which the user rotates first case 22 to lift it up, holds second case 23 with his/her right hand, and activates first operation section 217 with the thumb of his/her right hand to vertically orient the screen for capturing the image of the object. According to the rotation angle of first case 22 detected by rotation detector 26, controller 18 changes the orientation of icon 70 by 180 degrees for displaying it on display 210, and reverses functions allocated to four buttons 217A to 217D of first operation section 217. That is, the functions of the buttons do not change, e.g., a button at the upper position is provided for scaling up, and a button at the lower position is provided for scaling down.

As described above, upon first case 22 rotating, the orientation of the screen of display 210 can be easily switched in lateral and vertical orientations. The orientations are switched so as to have the orientation of icons on the screen match the orientation of the user holding second case 23. Therefore, even if first case 22 rotates, the orientations of a displayed image and operation sections 217 and 17 do not change for the user holding second case 23.

Further, as shown in FIG. 6, while first case 22 opens relative to second case 23, the user can use camera-equipped portable device 100 as a portable telephone and inputs telephone numbers through operation section 17, and presses a calling button.

Exemplary Embodiment 2

Figure 7:
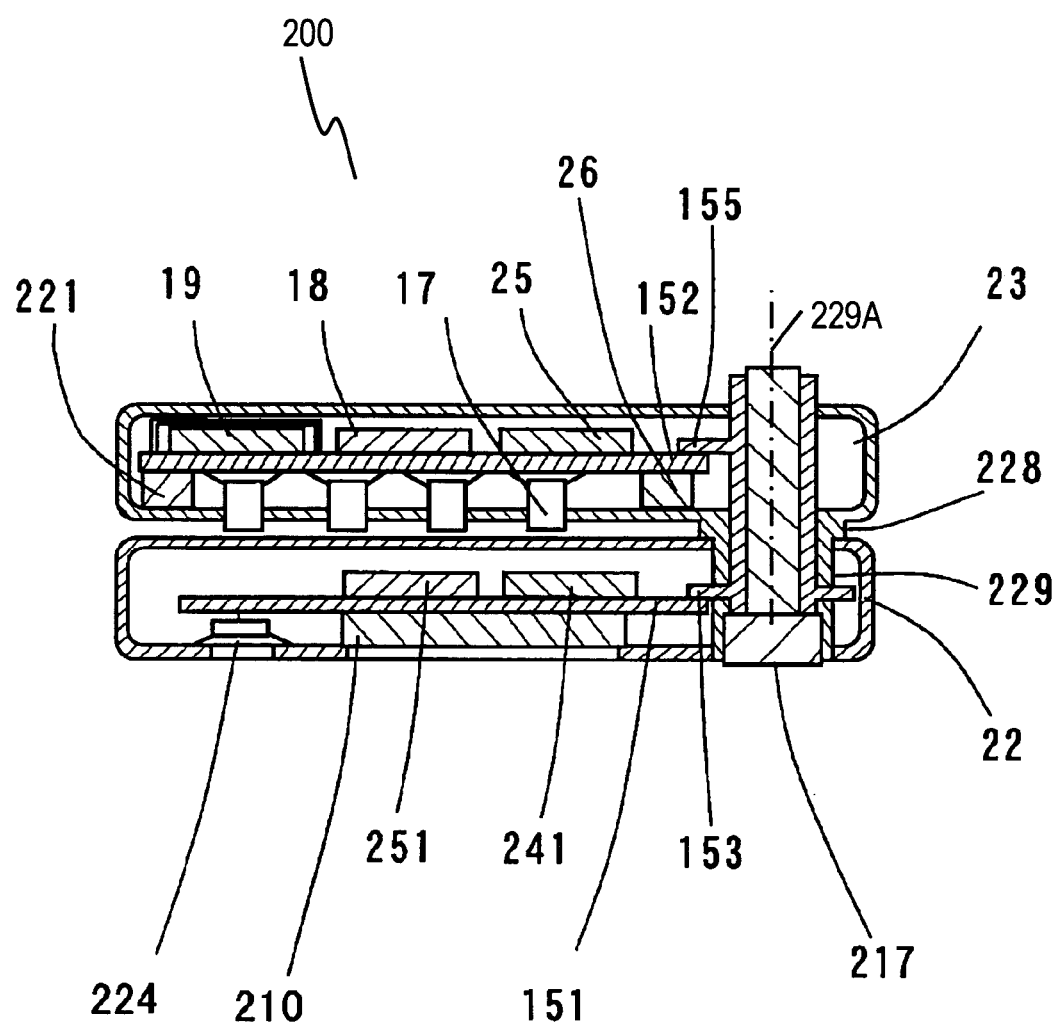
FIG. 7 is a cross sectional view of a camera-equipped portable device according to Exemplary Embodiment 2 of the invention.

FIG. 7 is a cross sectional view of camera-equipped portable telephone 200 as a camera-equipped portable device according to Exemplary Embodiment 2 of the present invention. In camera-equipped portable telephone 100 shown in FIG. 2A of Embodiment 1, rotation axis section 229 is provided at first case 22. In camera-equipped portable telephone 200 shown in FIG. 7, rotation axis section 229 is provided at second case 23. Slide connection section 155 is fitted in rotation axis section 229, and accommodates camera section 24. First operation section 217 is provided at an end portion of rotation axis 229. Similarly to portable device 100 of Embodiment 1, slide connection section 155 is connected to first printed circuit board 151 in first case 22 through contact section 153 having a flange that slides on first printed circuit board 151. As shown in FIGS. 2A and 2B, similarly to the device according to Embodiment 1, a ball is positioned in a pocket provided in contact section 153 so that first case 22 is positioned against second case 23 (not shown in FIG. 7).

In camera-equipped portable telephone 200 of Embodiment 2, camera section 24 and first operation section 217 are unitarily provided in rotation axis section 229, and do not rotate even if first case 22 including display 210 rotates against second case 23. Therefore, camera section 24 does not move. Further, functions allocated to buttons 217A to 217D of first operation section 217 may not be changed.

While the structure of camera section 24 of Embodiments 1 and 2 is not described in detail, rotation axis section 229 can accommodate a camera unit having a zoom mechanism as camera section 24.

Exemplary Embodiment 3

Figure 8:
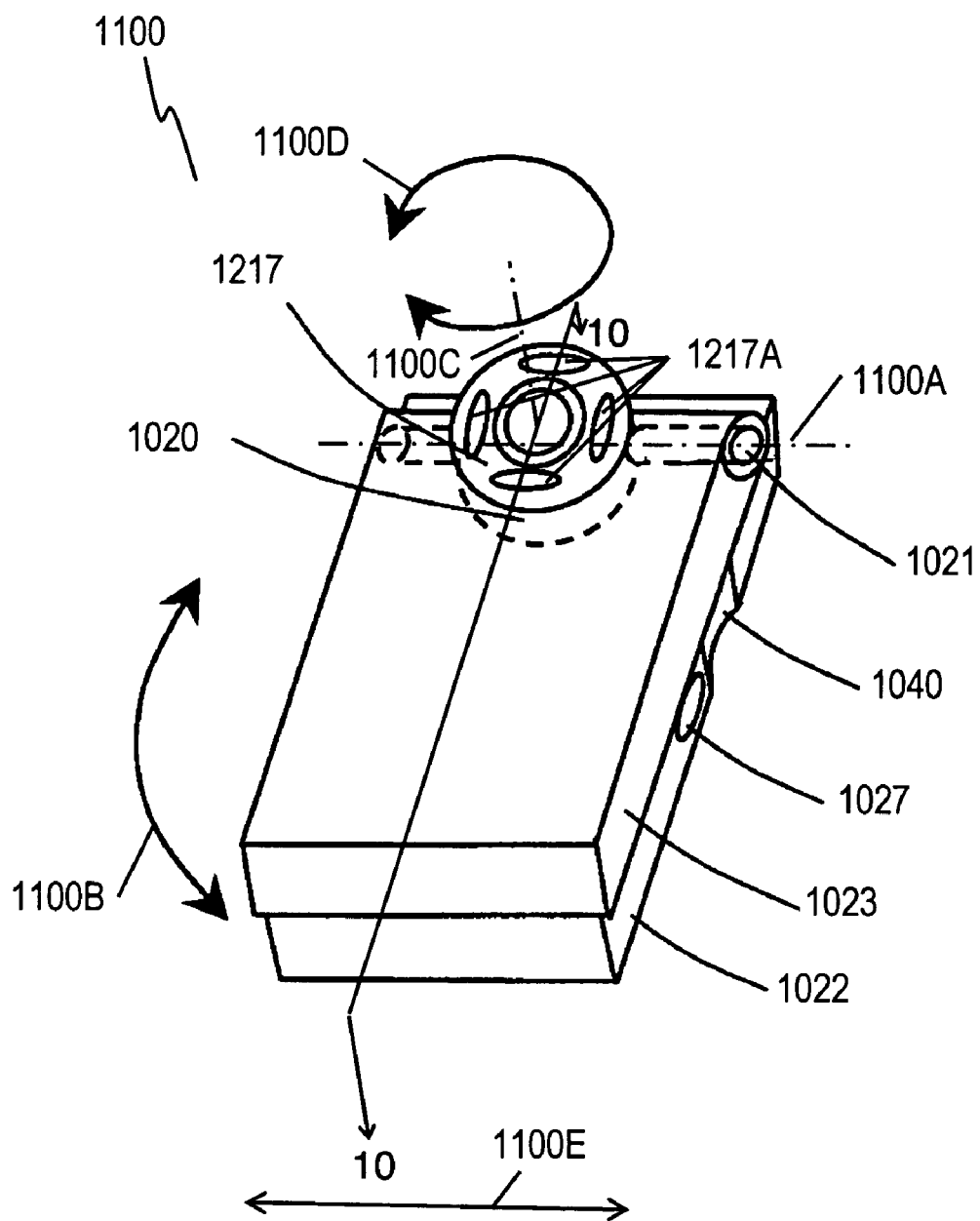
FIG. 8 is a perspective view of a camera-equipped portable device according to Exemplary Embodiment 3 of the invention.

FIG. 8 is a perspective view of camera-equipped portable telephone 1100 as a camera-equipped portable device according to Exemplary Embodiment 3 of the present invention. Portable telephone 1100 includes first case 1022 having a substantially rectangular shape, second case 1023 having a substantially rectangular shape, and hinge section 1020 for connecting first case 1022 to second case 1023. Hinge section 1020 allows first case 1022 to be opened and closed in direction 1100B about rotation axis 1100A relative to second case 1023, and allows first case 1022 to rotate in direction 1100D about rotation axis 1100C relative to second case 1023. Center axis (rotation axis) 1100C of a cylindrical section having a cylindrical shape of hinge section 1020 is perpendicular to a flat portion of first case 1022. A pair of support axes 1021 extend perpendicularly to center axis 1100C from the cylindrical section to the outside. Second case 1023 accommodates support axes 1021. This structure allows second case 1023 to rotate about center axis 1100D of the cylindrical section of hinge section 1020 as a rotation axis, and to be opened and closed relative to first case 1022 about support axes 1021.

A size of first case 1022 in width direction 1100E is smaller than a size of second case 1023 in width direction 1100E. This structure allows the user of portable telephone 1100 to lay his/her fingers easily on second case 1023 when the user opens second case 1023 while holding first case 1022. Recess 1040 formed in each side surface of first case 1022 allows the user to lay his/her fingers on the second case more easily.

Figure 9:
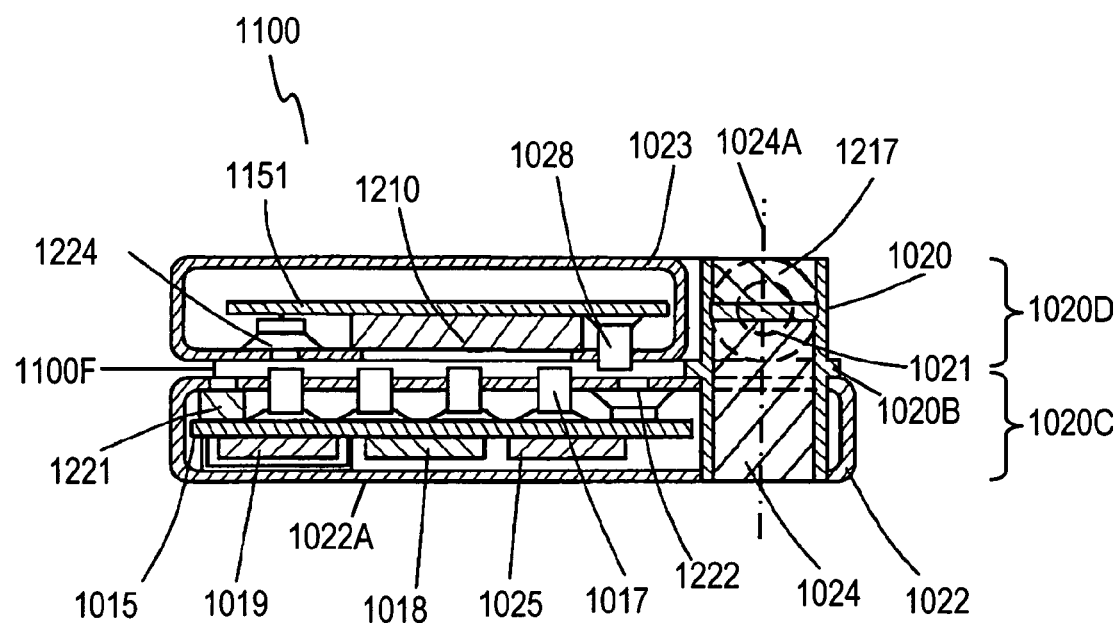
FIG. 9 is a cross sectional view of the camera-equipped portable device according to Embodiment 3.

FIG. 9 is a cross sectional view of portable telephone 1100 along line 10-10 shown in FIG. 8. First case 1022 accommodates printed circuit board 1015. Printed circuit board 1015 mounting thereon controller 1018, radio section 1019, memory 1025, microphone 221, ringer 222, and first key operation section 1017 formed of a numerical-key pad. Cylindrical hinge section 1020 is rotatably supported about a direction perpendicular to surface 1022A of first case 1022. Camera section 1024 is embedded in cylindrical section 1020A of hinge section 1020 unitarily with hinge section 1020 so that optical axis 1024A of camera section 1024 is parallel to rotation axis 1100C of hinge section 1020. When hinge section 1020 rotates, camera section 1024 accordingly rotates. Second key operation section 1217 formed of plural keys, such as a 4-direction key and an enter key, extends at the side of hinge section 1020 in a direction opposite to the direction in which camera section 1024 extends.

Hinge section 1020 is fixed to second case 1023 covering section 1020. Second case 1023 accommodates second printed circuit board 1151. Second printed circuit board 1151 mounts thereon display 1210, loudspeaker 1224, and display selection switch 1028 that is a part of the second key operation section. A flexible board (not shown) may connect among printed circuit board 1015, second printed circuit board 1151, camera section 1024, and second key operation section 1217. Hinge section 1020 has projection 1020B to provide gap 1100F between first case 1022 and second case 1023. Gap 1100F prevents second case 1023 from rubbing with components provided in first case 1022 even when second case 1023 rotates.

According to Embodiment 3, hinge section 1020 supports second case 1023 rotatably relative to first case 1022. In hinge section 1020, section 1020C accommodating camera section 1024 may be formed unitarily with first case 1022, and a portion 1020D of hinge section 1020 in which support axis 1021 is located may be provided with an optical axis for rotation together with second case 1023.

Figure 10:
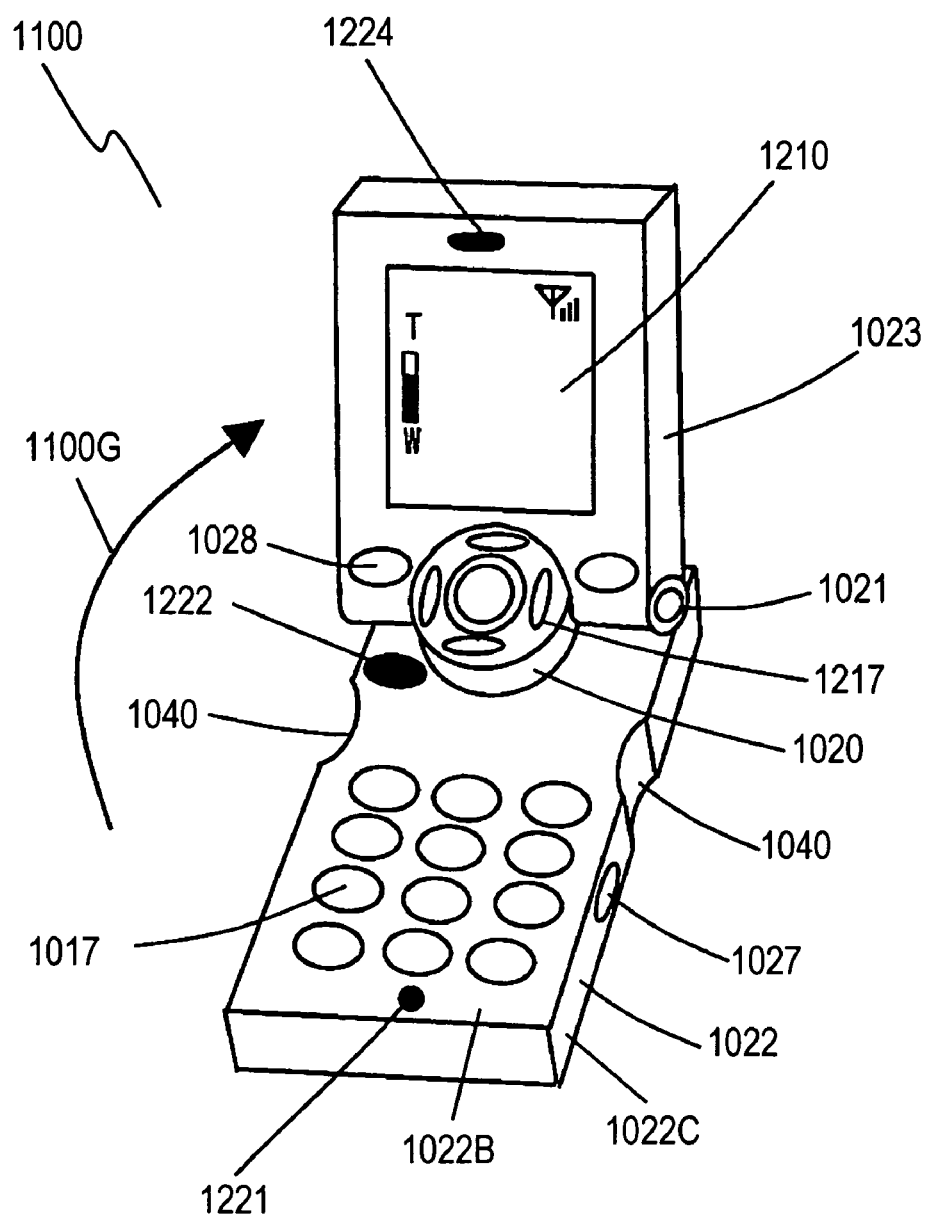
FIG. 10 is a perspective view of the camera-equipped portable device according to Embodiment 3.

FIG. 10 is a perspective view of portable telephone 1100 including second case 1023 opening in the direction denoted by arrow 100G. As shown in FIG. 9, key operation section 1017, such as a numerical-key pad for inputting signals like phone numbers, microphone 1221 functioning as a transmitter, and ringer 1222 for outputting an incoming-call tone in response to an incoming call are provided in surface 1022B of first case 1022. Camera image-capturing switch 1027 that is a part of key operation section 1017 is provided on side surface 1022C of first case 1022.

Second case 1023 accommodates display 1210, loudspeaker 1224 functioning as a receiver, and display selection switch 1028 for changing the orientation of display 1210 and functions allocated to second key operation section 1217.

Second case 1023 is provided with a stopper for preventing case 1023 from opening at an angle greater than a predetermined angle of about 120 degrees when the closed case opens from first case 1022 in the direction denoted by arrow 1100G.

Figure 11:
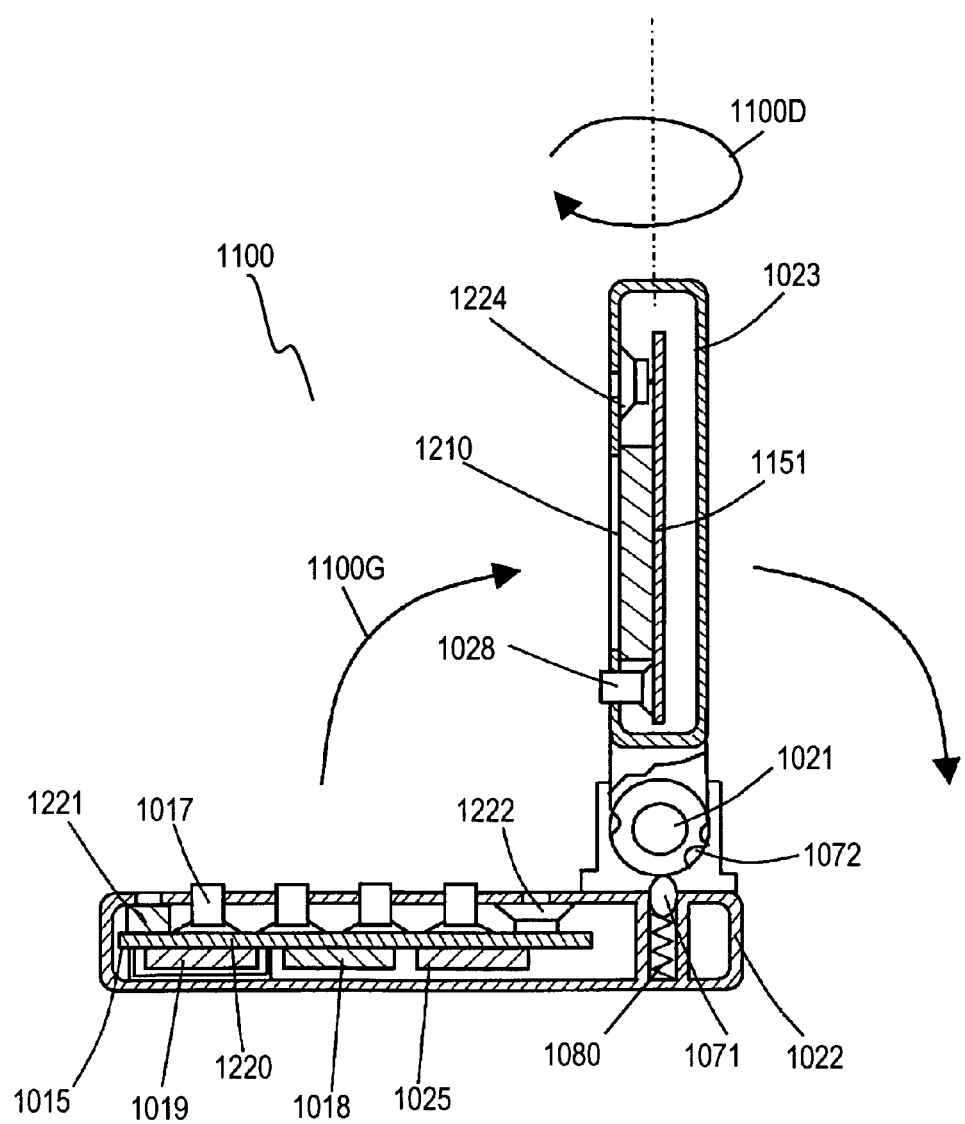
FIG. 11 is a cross sectional view of the camera-equipped portable device according to Embodiment 3.

FIG. 11 is a cross sectional view of portable telephone 1100 including second case 1023 standing perpendicularly with respect to first case 1022. The outer circumference of support axis 1021 of second case 1023 has recess 1072 formed therein. Spring 1080 lifts and engages positioning member 1071 in recess 1072. Recess 1072, spring 1080, and positioning member 1071 function as the stopper for preventing second case 1023 from opening away from first case 1022 at an angle greater than the predetermined angle. After second case 1023 is positioned against first case 1022 at the predetermined angle, e.g., at 120 degrees, when the user places loudspeaker 1224 to one of his/her ears for starting a conversation, microphone 1221 is positioned close to the mouth of the user of portable telephone 1100 to allowing the user to talk easily. This structure does not allow second case 1023 to rotate against first case 1022 in the user's bag or pocket, and thus, key operation section 1017 does not become exposed, hence preventing portable telephone 1100 from malfunction and breakage.

Further, an opening/closing operation in the direction denoted by arrow 1100G shown in FIG. 11 may be performed independently from a rotation in direction 1100D. Hence, as shown in FIG. 11, second case 1023 can rotate in the direction denoted by arrow 1100G even when case 23 stands perpendicularly with respect to first case 1022. A stopper (not shown in detail) for preventing second case 1023 from rotating at an angle greater than a predetermined angle relative to first case 1022 (hinge section 1020) in direction 1100D of hinge section 1020 may be implemented by a recess provided in an outer circumference of hinge section 1020 and a positioning stopper urged by a spring to be engaged in the recess similarly to positioning stopper 1071 urged by spring 1080 to be engaged in recess 1072.

Figure 12:
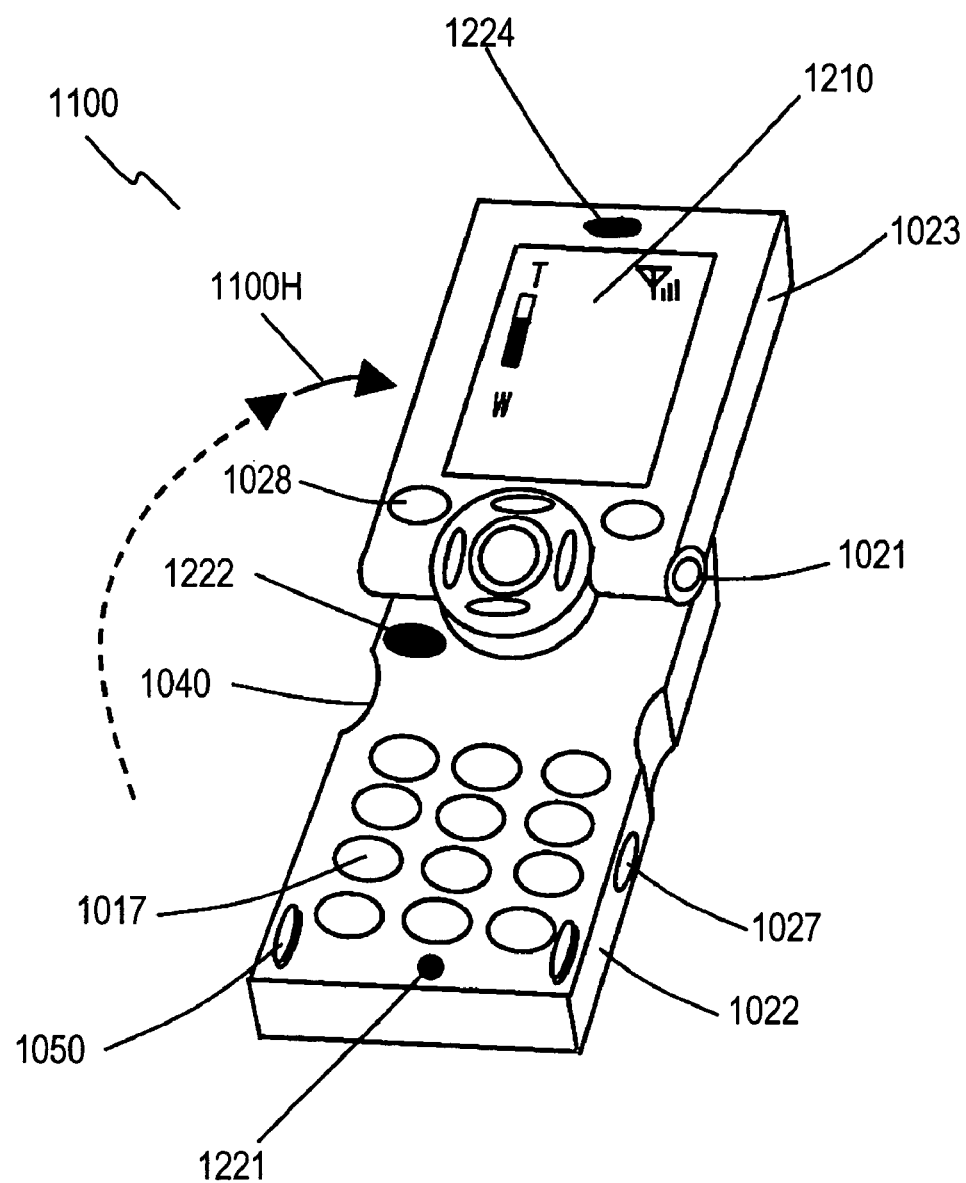
FIG. 12 is a perspective view of the camera-equipped portable device according to Embodiment 3.

FIG. 12 is a perspective view of portable telephone 1100 including second case 1023 opening in the direction denoted by arrow 1100H to an angle greater than the predetermined angle. Second case 1023 opens against first case 1022 at an angle of about 180 degrees. The user can input text, such as e-mail messages, through key operation section 1017 while looking at display 210 easily. Second case 1023 operable to open against first case 1022 at 180 degrees allows the user to use the telephone easily.

Figure 13:
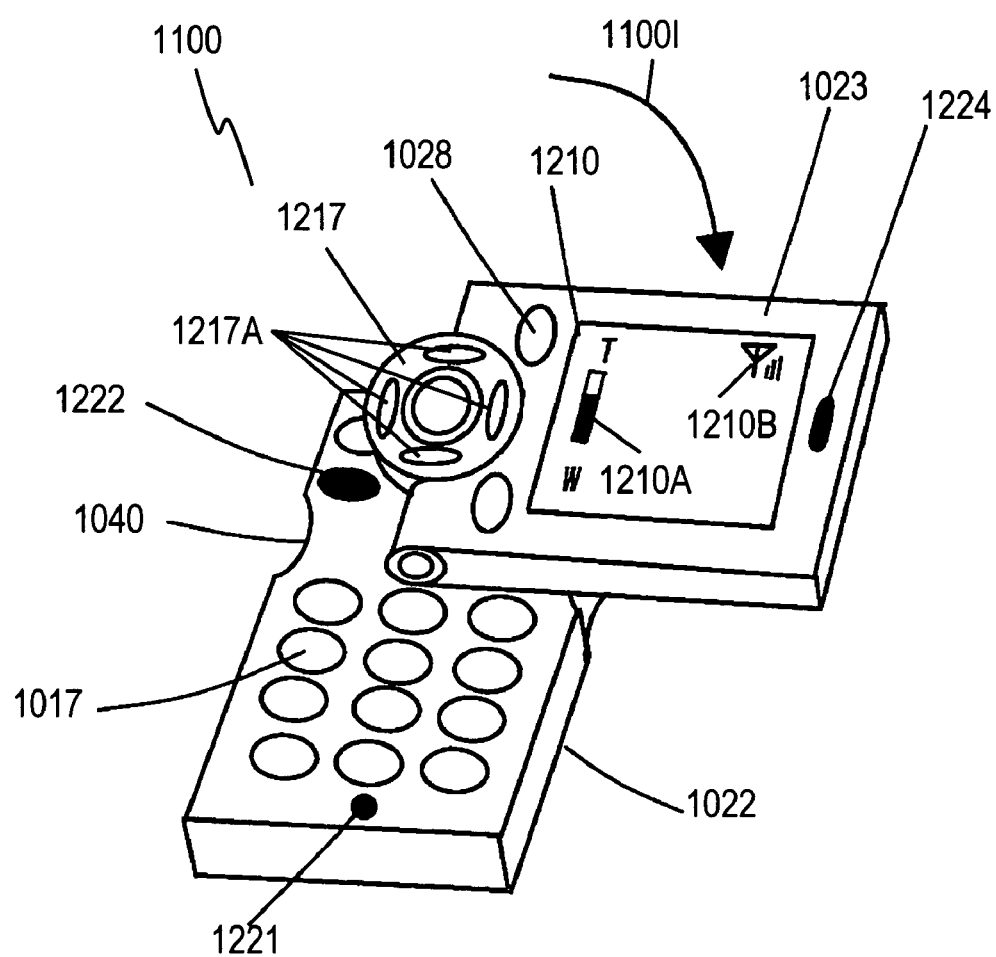
FIG. 13 is a perspective view of the camera-equipped portable device according to Embodiment 3.

FIG. 13 is a perspective view of portable telephone 1100 including second case 1023 rotating by 90 degrees in a right direction denoted by arrow 1100I from the state shown in FIG. 12. When hinge section 1020 rotates by 90 degrees together with second case 1023 in the right direction, camera section 1024 rotates accordingly since being embedded in hinge section 1020. If the object remains in the same posture, camera section 1024 and display 1210 rotate unitarily. Therefore, even with the rotation, an image displayed on display 1210 keeps the same orientation. The orientations of graphical objects displayed on display 1210, such as icon 1210A indicating a zoom status, an icon indicating a remaining battery, and icon 1210B indicating an electric field strength at an antenna, is detected by an opening/closing/rotation detector similarly to rotation detector 26 shown in FIG. 3 of Embodiment 1. According to the detected state, when second case 1023 rotates to be lateral to case 1022 as shown in FIG. 13, the orientation of the icons is changed to match the state of second case 1023, and functions allocated to keys 1217A of second key operation section 1217 are also changed. Then, as shown in FIG. 13, camera section 1024 can capture the image of the object while the image displayed laterally is looked at on display 1210.

Figure 14:
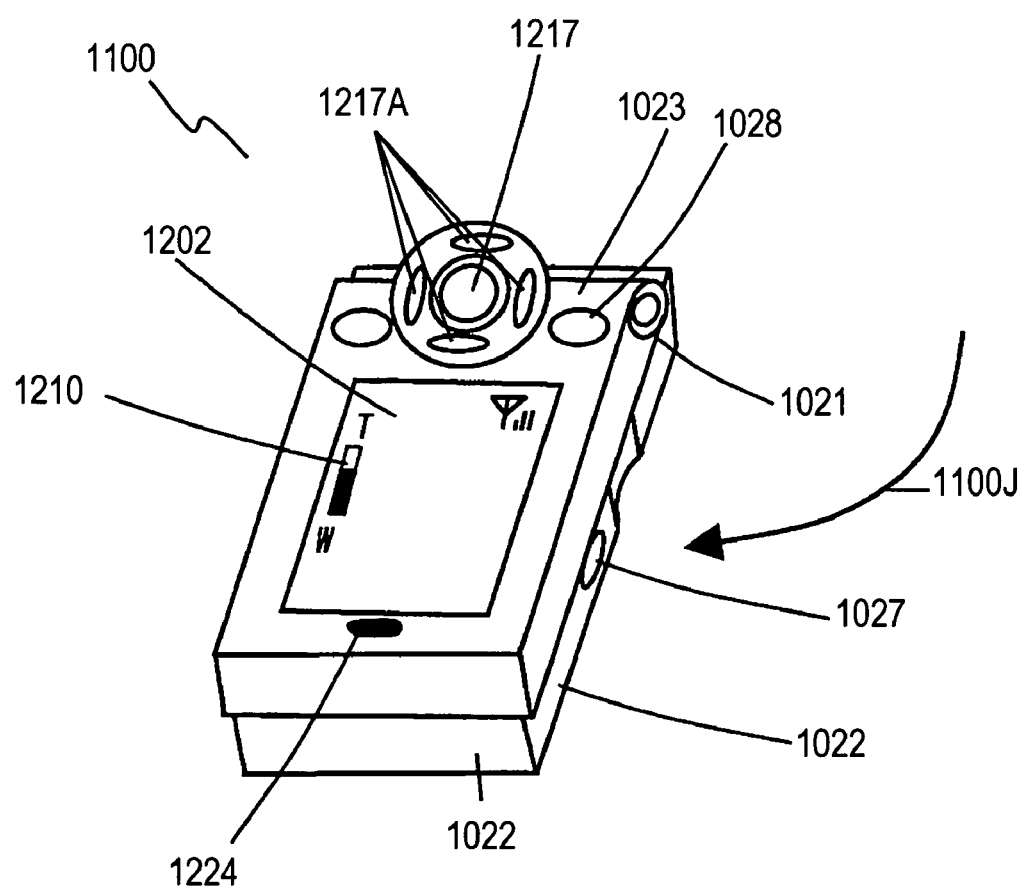
FIG. 14 is a perspective view of the camera-equipped portable device according to Embodiment 3.

FIG. 14 is a perspective view of portable telephone 1100 including second case 1023 rotated 90 degrees in the right direction further from the state shown in FIG. 13. Even if second case 1023 rotates together with camera section 1024, camera section 1024 and display 1210 rotate unitarily, and thus the orientation of a displayed image does not change even during the rotation. In FIG. 14, portable telephone 1100 has a small size like an ordinary digital camera since camera section 1024 is oriented opposite to display 1210, and second case 1023 is placed over first case 1022. Portable telephone 1100 can be used as a digital camera by changing the display orientation with display selection switch 1028 and by changing the functions allocated to keys 1217A of second key operation section 1217.

Figure 15:
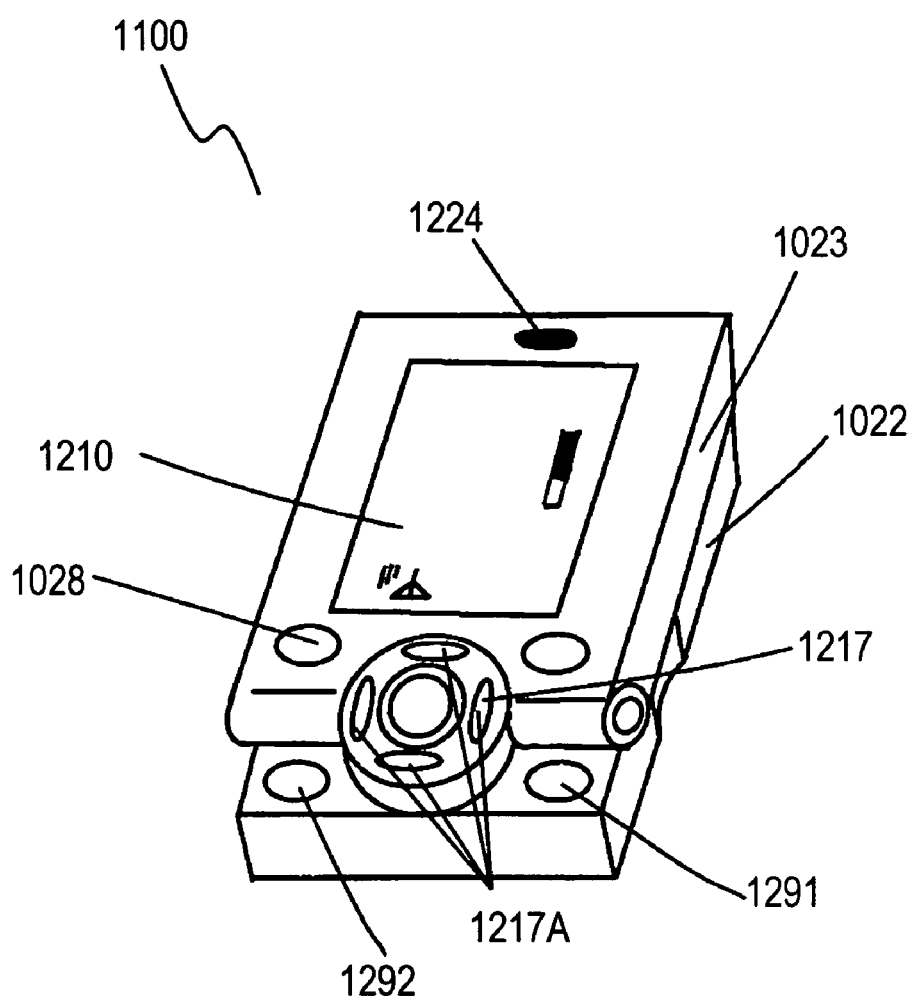
FIG. 15 is a perspective view of the camera-equipped portable device according to Embodiment 3.

As shown in FIG. 15, upon holding portable telephone 1100 shown in FIG. 14, the user can operate switches 1291 and 1292 which are provided on first case 1022 and which are not covered with second case 1023. Switches 1291 and 1292 may have functions as buttons for image-capturing with flash and for self timer, thus providing portable telephone 1100 with more various operations. Switch 1291 may function as a start-a-call button, thus allowing the user to use the button to answer an incoming call.

Figure 16:
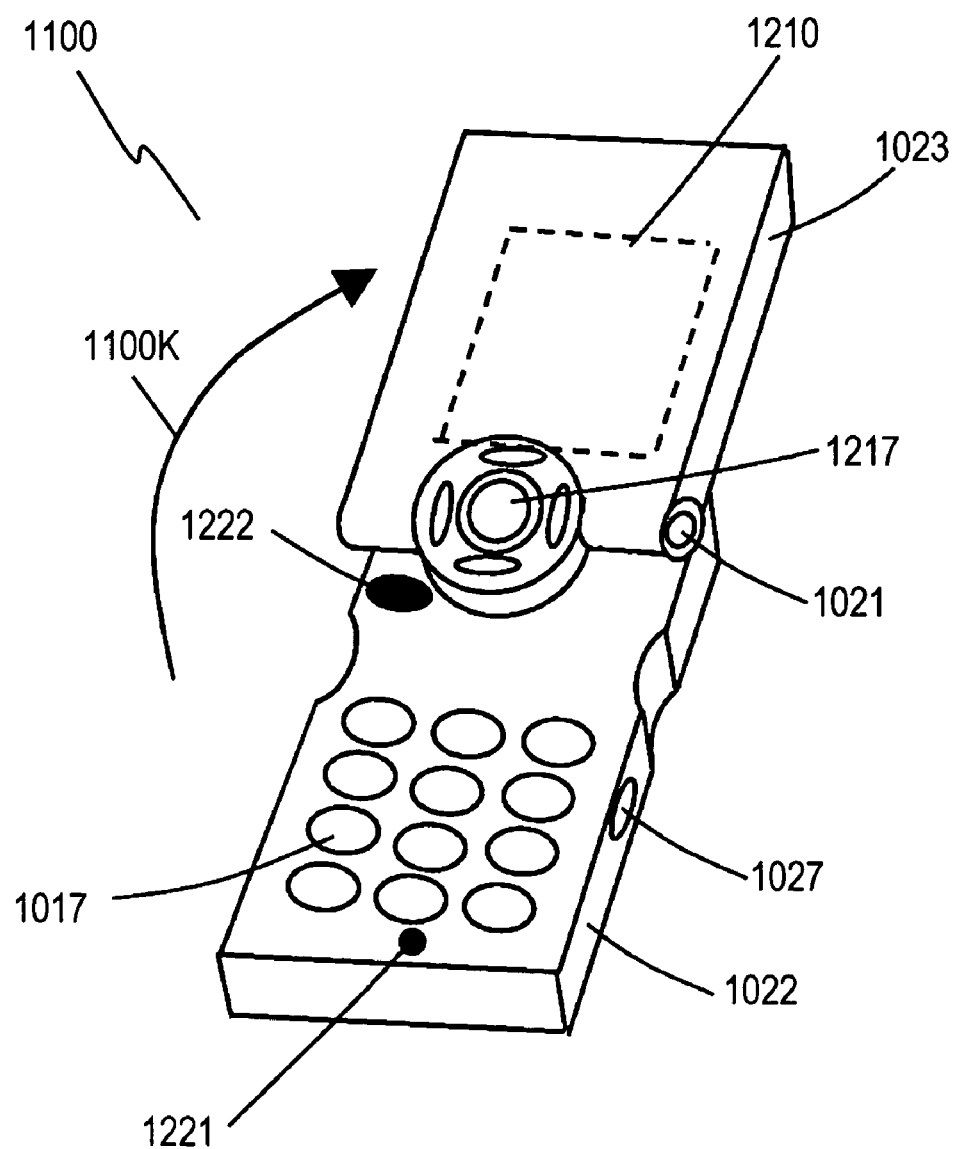
FIG. 16 is a perspective view of the camera-equipped portable device according to Embodiment 3.

FIG. 16 is a perspective view of portable telephone 1100 including second case 1023 rotating as denoted by arrow 1100K from the state shown in FIG. 14. In FIG. 16, camera section 1024 is in the same orientation as display 1210, thereby allowing the user holding camera-equipped portable telephone 1100 to capture an image of his/her face while looking at it, and allowing the user to use the telephone as a mirror as to look at his/her face displayed on display 1210.

Figure 17:
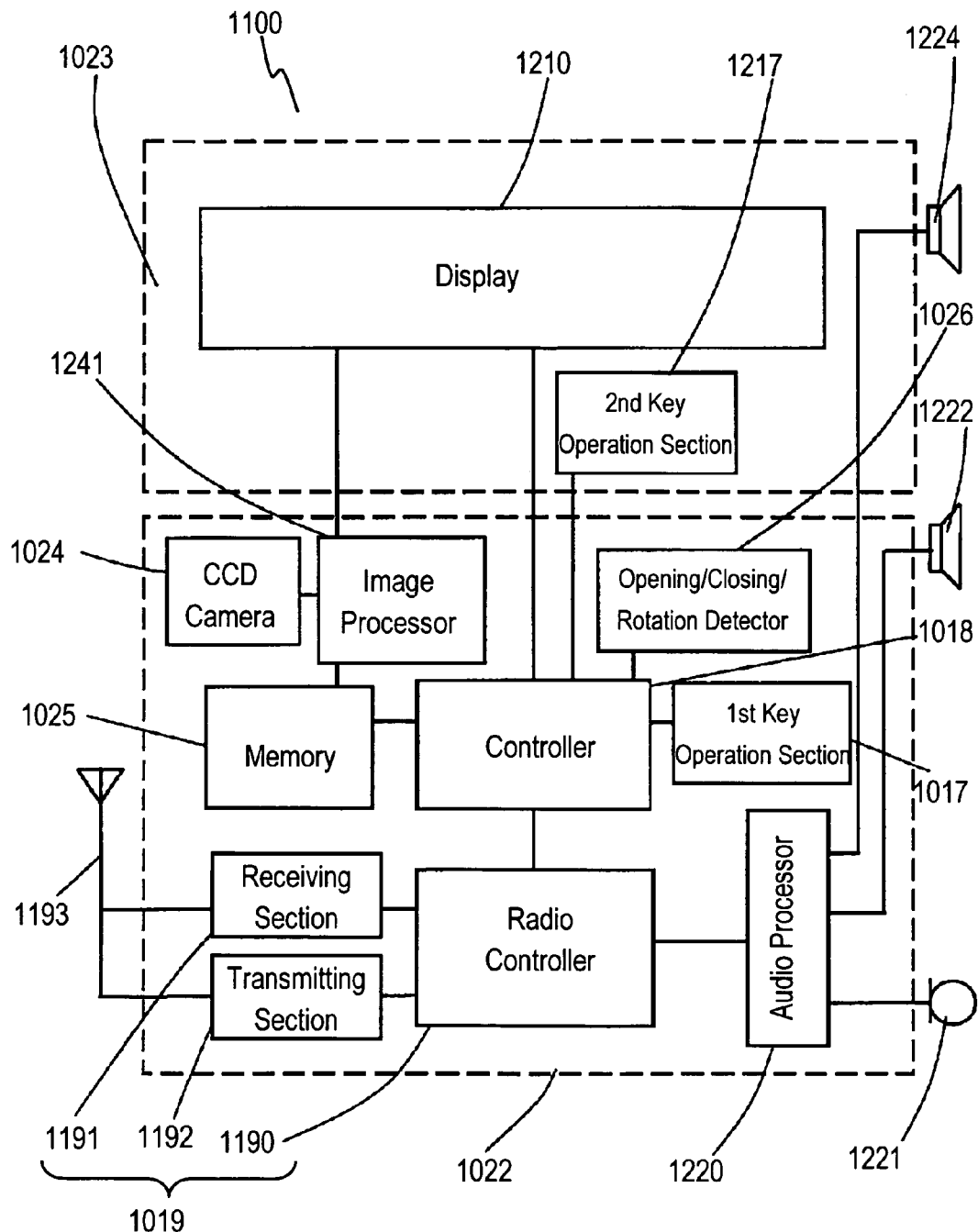
FIG. 17 is a block diagram of the camera-equipped portable device according to Embodiment 3.

FIG. 17 is a block diagram of camera-equipped portable telephone 1100. First case 1022 and second case 1023 are indicated by broken lines. First case 1022 accommodates camera section 1024, image processor 1241, controller 1018, opening/closing/rotation detector 1026, memory 1025, first key operation section 1017, radio section 1019, audio processor 1220, microphone 1221, and ringer 1222. Radio section 1019 includes radio controller 1190, receiving section 1191, and transmitting section 1192. Antenna 1193 protrudes from first case 1022. Second case 1023 accommodates display 1210, second key operation section 1217, and loudspeaker 1224.

Display 1210 of second case 1023 may display a software key. The software key may have a function of display selection switch 1028 located around display 1210. The software key displayed on display 1210 prevents the user from being confused to determine which button to press even if second case 1023 including display 1210 rotates.

Figure 18:
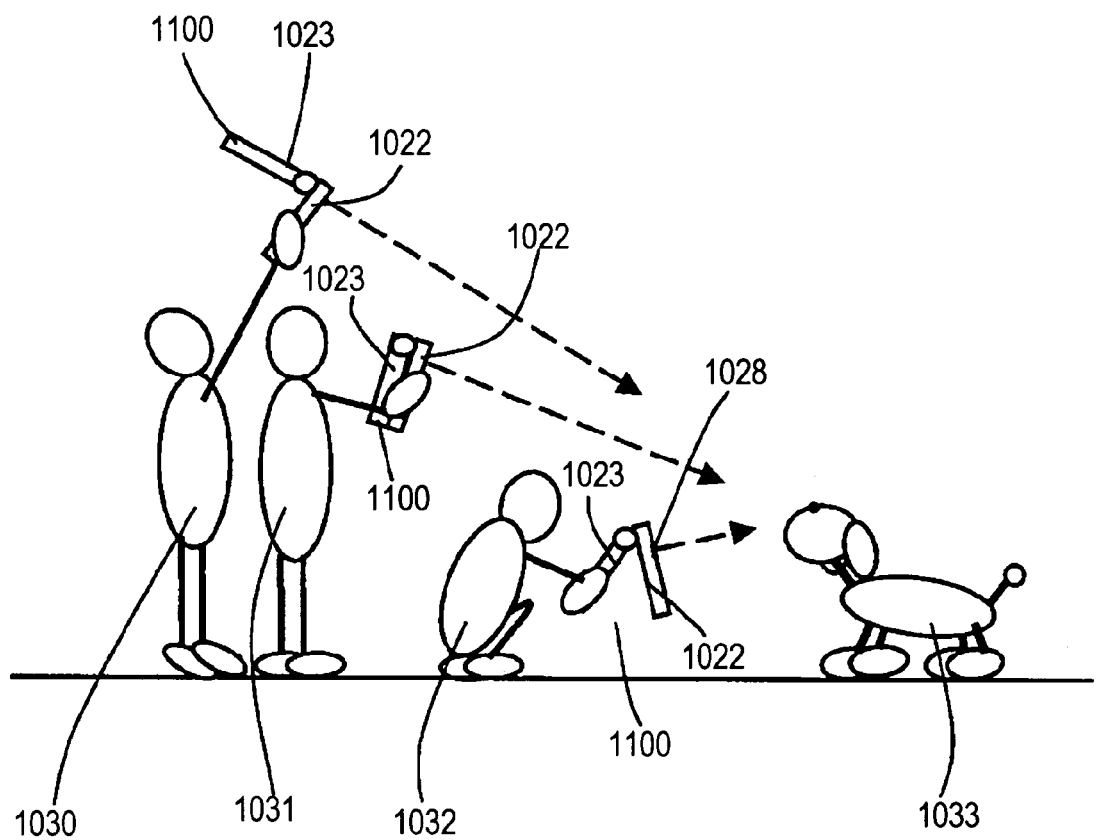
FIG. 18 is a conceptual diagram of the camera-equipped portable device in use according to Embodiment 3.

In camera-equipped portable device 1100 of Embodiment 3, camera section 1024 is mounted so as to be directed toward lower surface 1022A of first case 1022. FIG. 18 is a conceptual diagram of camera-equipped portable telephone 1100 in use according to Embodiment 3. As shown in FIG. 18, second case 1023, being open or closed in various ways, directs camera section 1024 of portable telephone 1100 at various angles to capture the image of the object. Users 1030, 1031, and 1032 each holding camera-equipped portable telephone 1100 capture an image of object 1033 from at a high angle, from at a normal angle, and from at a low angle, respectively. User 1030 captures the image of object 1033 while opening second case 1023. User 1031 captures the image of object 1033 while closing second case 1023. User 1032 captures the image of object 1033 while reversing second case 1023 and holding second case 1023. Display selection switch 1028 located around display 1210 may be set to a software key functioning as a shutter button, the user can capture the image of object 1033 from at a low angle by pressing the software key near display 1210 while looking at object 1033 on display 1210.

INDUSTRIAL APPLICABILITY

A portable device according to the present invention can accommodate a camera section with high resolution being long in the direction of its optical axis so that the optical axis is directed perpendicularly to a surface of a case.

The invention claimed is:

1. A portable device, comprising:
    a camera section having an optical axis and being capable of capturing an image of an object in an image-capturing direction parallel to the optical axis;
    a display capable of displaying the image captured by the camera section;
    a first case having a first surface and a second surface opposite to the first surface, the first surface having the display provided therein;
    a second case that can be positioned over the second surface of the first case;
    a rotation axis section supporting the second case to the first case rotatably about a rotation axis perpendicular to the first surface of the first case, the rotation axis section accommodating the camera section, the optical axis being parallel to the rotation axis, the image-capturing direction being directed from the first surface of the first case to the second surface of the first case; and
    an operation section configured to operate at least one of the camera section and the display, the operation section being provided at a portion of the first surface of the first case opposite to the image-capturing direction of the rotation axis of the rotation axis section.

2. The portable device according to claim 1, wherein the camera section is fixed for the first case.

3. The portable device according to claim 1, wherein the camera section is fixed for the second case.

4. The portable device according to claim 1, further comprising:
    a position detector for detecting a relative position of the second case with respect to the first case; and
    a controller for changing a display orientation of the display according to the detected relative position.

5. The portable device according to claim 1, wherein the operation section includes a plurality of keys for operating at least one of the camera section and the display, the portable device further comprising:
    a position detector for detecting a relative position of the second case with respect to the first case; and
    a controller for allocating functions to the keys of the operation section according to the detected relative position.

6. The portable device according to claim 1, further comprising a stopper for stopping rotation of the second case against the first case at a predetermined angle.

7. The portable device according to claim 1, further comprising a stopper for stopping rotation of the second case relative to the first case at a plurality of predetermined angles.

8. The portable device according to claim 1, wherein a width of the second case in a direction substantially parallel to a rotation direction of the rotation axis is smaller than a width of the first case in the direction substantially parallel to the rotation direction.

9. The portable device according to claim 1, wherein the first case is placed in a direction substantially parallel to a rotation direction of the rotation axis, and the first case has a side surface having a recess formed therein.

10. The portable device according to claim 1, further comprising a projection for providing a gap between the first case and the second case in a direction parallel to the rotation axis.

11. A portable device comprising:
    a camera section having an optical axis and being capable of capturing an image of an object in an image-capturing direction parallel to the optical axis;
    a first case having a first surface and a second surface opposite to the first surface;
    a second case that can be positioned over the second surface of the first case; and
    a hinge section supporting the second case to the first case rotatably about a first rotation axis perpendicular to the first surface of the first case and about a second rotation axis perpendicular to the first rotation axis, the hinge section accommodating the camera section, the optical axis being parallel to the first rotation axis, and the image-capturing direction is directed from the first surface of the first case to the second surface of the first case.

12. The portable device according to claim 11, further comprising an operation section for operating at least one of the camera section and the display, the operation section being provided at a portion of the first surface of the first case opposite to the image-capturing direction of the first rotation axis of the rotation axis section.

13. The portable device according to claim 11, further comprising a display capable of displaying the image captured by the camera section, the display being provided at one of the first case and the second case.

14. The portable device according to claim 13, further comprising:
 a position detector for detecting a relative position of the second case with respect to the first case; and
 a controller for changing a display orientation of the display according to the detected relative position.

15. The portable device according to claim 13, further comprising:
 a display selection switch; and
 a controller for changing an orientation of an image displayed on the display according to a state of the display selection switch.

16. The portable device according to claim 13, wherein the display is provided at a surface of the second case that can face the second surface of the first case.

17. The portable device according to claim 13, further comprising a switch provided on the second case near the display.

18. The portable device according to claim 11, further comprising a stopper for stopping rotation of the second case relative to the first case about the second rotation axis at a plurality of angles.

19. The portable device according to claim 11, further comprising a stopper for stopping rotation of the second case relative to the first case about the first rotation axis at a plurality of angles.

20. The portable device according to claim 11, further comprising a projection for providing a gap between the first case and the second case in a direction parallel to the first rotation axis.

21. The portable device according to claim 11, wherein the camera section is fixed for the second case.

22. The portable device according to claim 11, further comprising a switch provided at the first case, the switch being activated when the second case is placed over the second surface of the first case.

23. The portable device according to claim 11, wherein a width of the second case in a direction substantially parallel to a rotation direction of the first rotation axis is smaller than a width of the first case in the direction substantially parallel to the rotation direction.

24. The portable device according to claim 11, wherein the first case is placed in a direction substantially parallel to a rotation direction of the first rotation axis, and the first case has a side surface having a recess formed therein.

25. The portable device according to claim 11, further comprising a stopper for stopping rotation of the second case relative to the first case about the second rotation axis at a predetermined angle.

26. The portable device according to claim 11, further comprising a stopper for stopping rotation of the second case relative to the first case about the first rotation axis at a predetermined angle.

* * * * *